(12) United States Patent
Yuan et al.

(10) Patent No.: US 11,645,054 B2
(45) Date of Patent: May 9, 2023

(54) MAPPING NATURAL LANGUAGE AND CODE SEGMENTS

(71) Applicant: International Business Machines Corporation, Armonk, NY (US)

(72) Inventors: Zhong Fang Yuan, Xi'an (CN); Bin Shang, Xi'an (CN); Li Ni Zhang, Beijing (CN); Yong Fang Liang, Beijing (CN); Chen Gao, Xi'an (CN); Tong Liu, Xi'an (CN)

(73) Assignee: International Business Machines Corporation, Armonk, NY (US)

(*) Notice: Subject to any disclaimer, the term of this patent is extended or adjusted under 35 U.S.C. 154(b) by 64 days.

(21) Appl. No.: 17/337,634

(22) Filed: Jun. 3, 2021

(65) Prior Publication Data
US 2022/0391183 A1 Dec. 8, 2022

(51) Int. Cl.
G06F 9/44 (2018.01)
G06F 8/41 (2018.01)
G06F 8/36 (2018.01)
G06F 40/279 (2020.01)
G06N 20/00 (2019.01)
(Continued)

(52) U.S. Cl.
CPC ............ G06F 8/43 (2013.01); G06F 8/36 (2013.01); G06F 8/75 (2013.01); G06F 40/279 (2020.01); G06N 3/04 (2013.01); G06N 20/00 (2019.01)

(58) Field of Classification Search
None
See application file for complete search history.

(56) References Cited

U.S. PATENT DOCUMENTS

| 9,009,664 B2 | 4/2015 | Muddu et al. |
| 9,645,816 B2 | 5/2017 | Shlosberg |
| 11,455,161 B2 * | 9/2022 | Prasad ............. G06F 8/65 |

(Continued)

FOREIGN PATENT DOCUMENTS

| CN | 108717423 A | 10/2018 |
| CN | 111142850 A | 5/2020 |

OTHER PUBLICATIONS

CN 107943514 English translation (Year: 2018).*
(Continued)

*Primary Examiner* — Insun Kang
(74) *Attorney, Agent, or Firm* — Patterson + Sheridan, LLP (57) ABSTRACT

Techniques are provided for mapping natural language to code segments. In one embodiment, the techniques involve receiving a document and software code, wherein the document comprises a natural language description of a use of the code, generating, via a vectorization process performed on the document, at least one vector or word embedding, generating, via a natural language processing technique performed on the at least one vector or word embedding, a first label set, generating, via a machine learning analysis of the software code, a second label set, determining, based on a comparison of the first label set and the second label set, a match confidence between the document and the software code, wherein the match confidence indicates a measure of similarity between the first label set and the second label set, and upon determining that the match confidence exceeds a predefined threshold, mapping the document to the software code.

20 Claims, 5 Drawing Sheets

(51) Int. Cl.
  *G06N 3/04* (2023.01)
  *G06F 8/75* (2018.01)

(56) References Cited

U.S. PATENT DOCUMENTS

| | | | | |
|---|---|---|---|---|
| 2017/0371629 | A1* | 12/2017 | Chacko | G06F 8/36 |
| 2020/0117446 | A1* | 4/2020 | Smith | G06F 8/36 |
| 2021/0191696 | A1* | 6/2021 | Ibarra Von Borstel | |
| | | | | G06F 40/279 |
| 2021/0192321 | A1* | 6/2021 | Zhang | G06N 3/0445 |
| 2022/0107799 | A1* | 4/2022 | Wu | G06N 20/00 |
| 2022/0138266 | A1* | 5/2022 | Wang | G06N 3/0445 |
| | | | | 707/722 |
| 2022/0236964 | A1* | 7/2022 | Bahrami | G06F 8/74 |
| 2022/0244937 | A1* | 8/2022 | Prasad | G06K 9/6215 |
| 2022/0244952 | A1* | 8/2022 | Breslav | G06F 8/36 |

OTHER PUBLICATIONS

CN 111104159 English translation (Year: 2020).*
CN110750297 English translation (Year: 2020).*
CN112507065 English translation (Year: 2021).*
Disclosed Anonymously, "System for automatically generating source code documentation with variable specificity," IP.com No. IPCOM00214882D, IP.com Publication date: Feb. 8, 2012.
Chaterjee et al., "Extracting Code Segments and Their Descriptions from Research Articles," Research Gate, May 2017, 12 pages.

* cited by examiner

MAPPING NATURAL LANGUAGE AND CODE SEGMENTS

BACKGROUND

The present invention relates to mapping segments of a document to segments of code, and more specifically, to mapping natural language in the document to corresponding segments of code based on label matching confidence.

Traditional approaches to mapping segments of documents and segments of code involve a software developer interpreting the documents and parsing code to determine which segments of the code correspond to the document. One issue with the traditional approaches is that the mapping process is labor intensive, and thus costly to implement. Further, knowledge of the mapping is particular to each software developer, and cannot be effectively reused by oncoming software developers. This issue is further exacerbated when trying to scale the mappings across organizations.

SUMMARY

A computer-readable storage medium including computer program code that, when executed on one or more computer processors, performs an operation is provided according to one embodiment of the present disclosure. The operation comprises receiving a document and software code, wherein the document comprises a natural language description of a use of the code; generating, via a vectorization process performed on the document, at least one vector or word embedding; generating, via a natural language processing technique performed on the at least one vector or word embedding, a first label set; generating, via a machine learning analysis of the software code, a second label set; determining, based on a comparison of the first label set and the second label set, a match confidence between the document and the software code, wherein the match confidence indicates a measure of similarity between the first label set and the second label set; and upon determining that the match confidence exceeds a predefined threshold, mapping the document to the software code.

A method is provided according to one embodiment of the present disclosure. The method comprises receiving a document and software code, wherein the document comprises a natural language description of a use of the code; generating, via a vectorization process performed on the document, at least one vector or word embedding; generating, via a natural language processing technique performed on the at least one vector or word embedding, a first label set; generating, via a machine learning analysis of the software code, a second label set; determining, based on a comparison of the first label set and the second label set, a match confidence between the document and the software code, wherein the match confidence indicates a measure of similarity between the first label set and the second label set; and upon determining that the match confidence exceeds a predefined threshold, mapping the document to the software code.

A system is provided according to one embodiment of the present disclosure. The system comprises a processor; and a memory storing an application which, when executed by the processor, performs an operation comprising: receiving a document and software code, wherein the document comprises a natural language description of a use of the code; generating, via a vectorization process performed on the document, at least one vector or word embedding; generating, via a natural language processing technique performed on the at least one vector or word embedding, a first label set; generating, via a machine learning analysis of the software code, a second label set; determining, based on a comparison of the first label set and the second label set, a match confidence between the document and the software code, wherein the match confidence indicates a similarity between the first label set and the second label set; and upon determining that the match confidence exceeds a predefined threshold, mapping the document to the software code.

DETAILED DESCRIPTION

Embodiments of the present disclosure are directed towards techniques for automatically mapping segments of a document to segments of code based on a label matching confidence. The label matching confidence is determined from a comparison of labels generated from the document and labels generated from the code.

Figure 1:
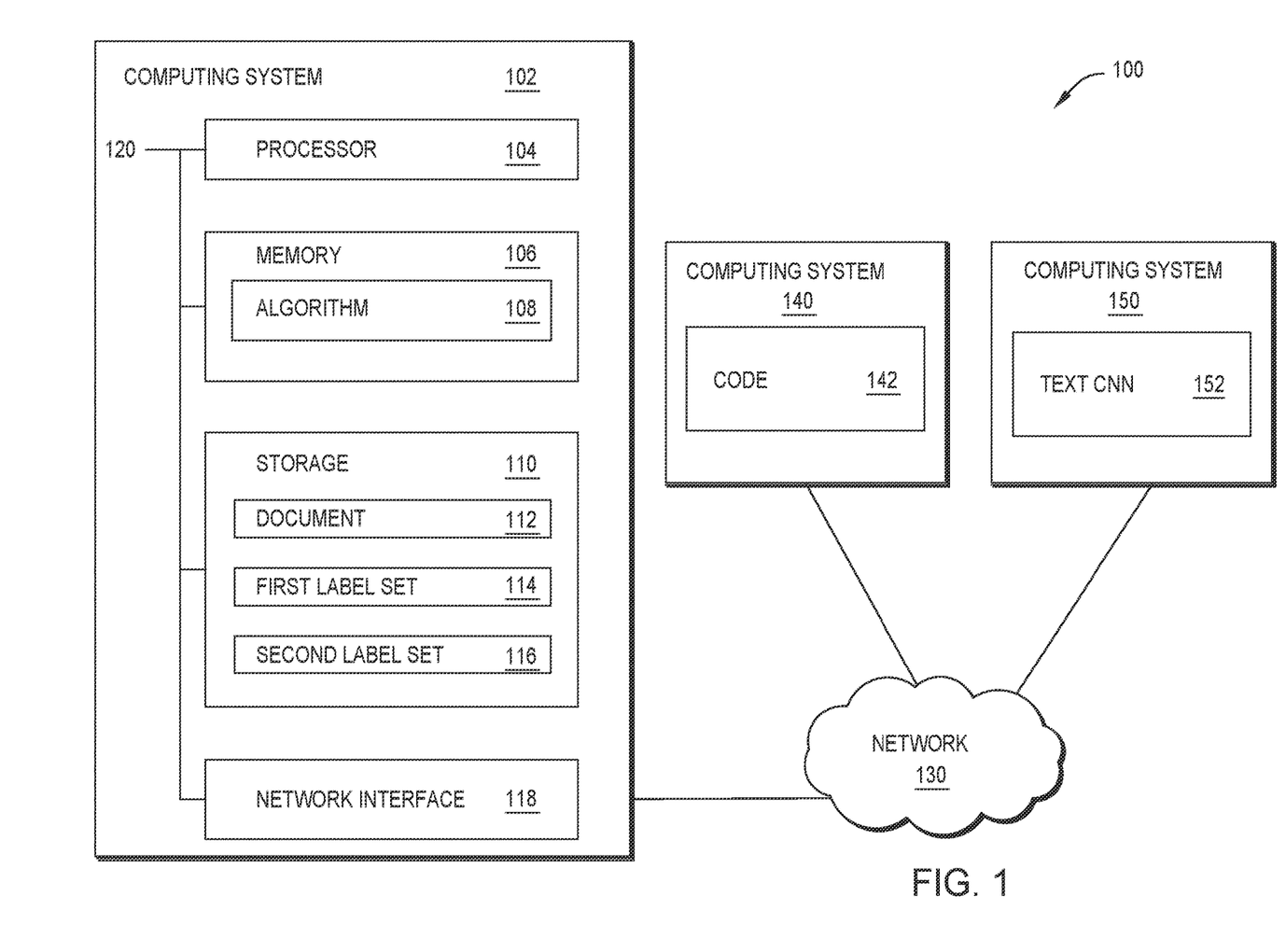
FIG. 1 illustrates a document and code mapping system, according to one embodiment.

FIG. 1 illustrates a document and code mapping system 100, according to one embodiment. In the illustrated embodiment, the document and code mapping system 100 comprises a computing system 102 that implements a mapping algorithm 108 to map segments of a document 112 to segments of code 142.

The computing system 102 generally includes a processor 104 that obtains instructions and data via a bus 120 from memory 106 or storage 110. Not all components of the computing system 102 are shown. The processor 104 is a programmable logic device that performs instruction, logic, and mathematical processing, and may be representative of one or more CPUs. The processor may execute one or more algorithms, instruction sets, or applications in memory 106 or storage 110.

The memory 106 and storage 110 can be representative of hard-disk drives, solid state drives, flash memory devices, optical media, and the like. The storage 110 can also include structured storage, e.g. a database. In addition, the memory 106 and storage 110 may be considered to include memory physically located elsewhere; for example, on another computing system coupled to the computing system 102.

The computing system 102 can be connected to other computing systems (e.g. distributed databases, servers, or web-hosts) via a network interface 118 and network 130 (illustrated as bidirectional arrows). The network 130 can comprise, for example, the Internet, a local area network, a wide area network, or a wireless network. The network 130 can include any combination of physical transmission cables, optical transmission fibers, wireless transmission, routers, firewalls, switches, gateway computing systems and/or edge servers. The network interface 118 may be any type of network communications device allowing the computing system 102 to communicate with other computing systems via the network 130. The network interface 118 may exchange data with the network 130.

In one embodiment, the mapping algorithm 108 comprises a set of computer readable instructions or a software module in a software application that, when executed by the processor 104, performs the functions described herein. The mapping algorithm 108 can be stored in memory 106 or storage 110.

In the illustrated embodiment, the mapping algorithm 108 receives a document 112 from storage 110. In another embodiment, the document 112 is received from a computing system (not shown) coupled to computing system 102 over the network 130 via the network interface 118. The document 112 comprises a natural language description of a use of code. For instance, the document can be code comments, a code manual, a technical document, or a user story.

The mapping algorithm 108 can generate a first label set 114 from the document 112 via a keyword extraction process, a term frequency inverse document frequency (TF-IDF) process, part of speech tagging, an attention mechanism determination process, or via a text convolutional neural network (CNN) 152 hosted on a computing system 150 coupled to computing system 102 over the network 130 via the network interface 118. The first label set 114 can be stored in memory 106 or storage 110. The generation of the first label set 114 is discussed in greater detail in FIG. 2.

The mapping algorithm 108 can generate a second label set 116 by analyzing code 142 stored on a computing system 140 coupled to computing system 102 over the network 130 via the network interface 118. In one embodiment, computing system 140 is a server that hosts a code repository, a web application, or the like, that includes code 142. The second label set 116 can be stored in memory 106 or storage 110. Generation of the second label set 116 is discussed in greater detail in FIG. 3.

The mapping algorithm 108 can compare the first label set 114 and the second label set 116 to determine a matching confidence between the label sets. In one embodiment, the matching confidence is expressed as a number between 0-1, or a percentage. The mapping algorithm 108 can compare the matching confidence to a predefined threshold to map a segment of the document 112 to a segment of code 142. For example, if the matching confidence exceeds a predefined threshold of 0.7, the mapping algorithm 108 determines that the matching confidence is great enough to ensure an accurate mapping from the segment of the document 112 to the segment of code 142.

One benefit to the aforementioned document and code mapping system is the automatic mapping of pertinent portions of a document to a corresponding segment of code, which allows any user to utilize the mapping without having to repeat the mapping process.

Figure 2:
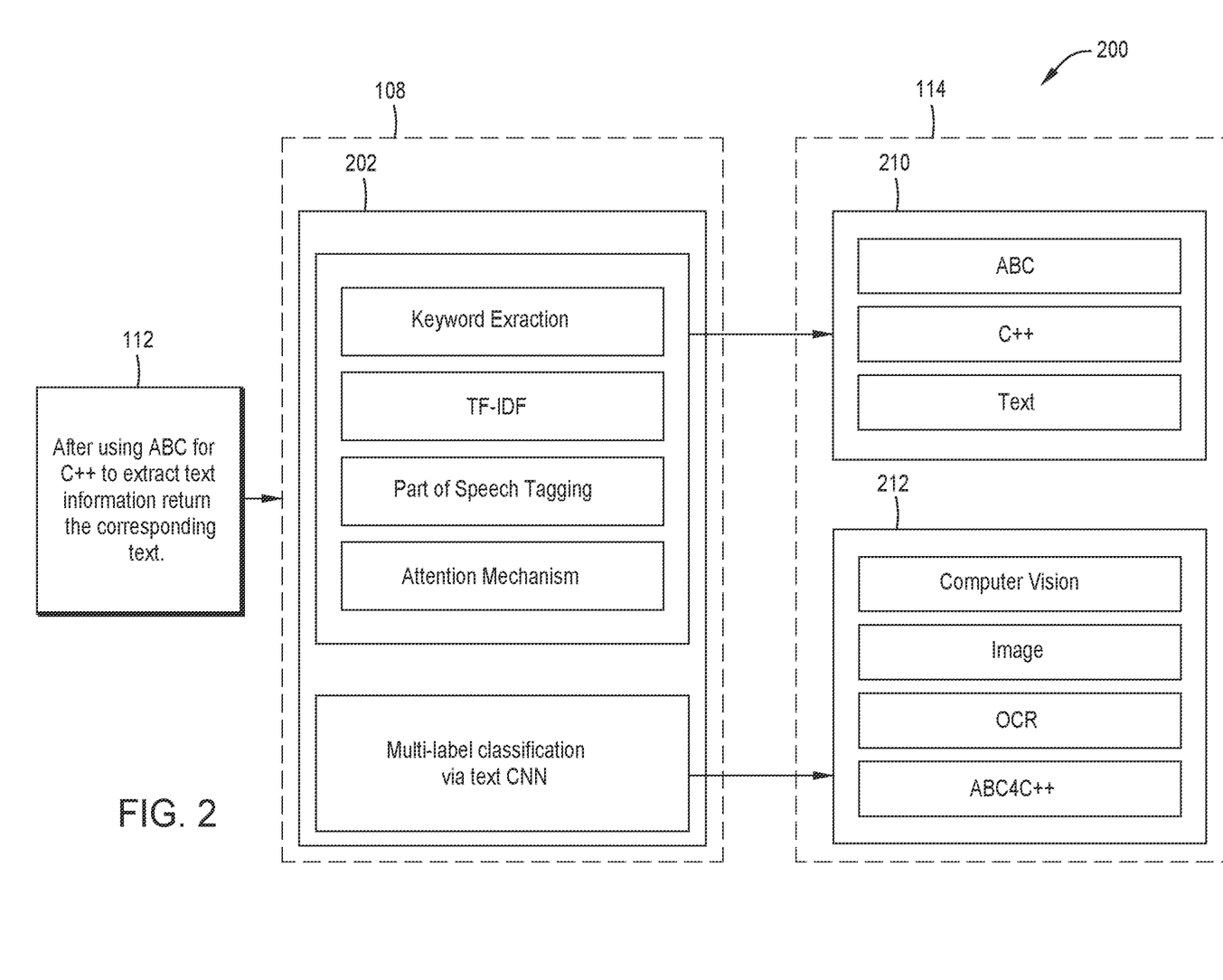
FIG. 2 illustrates a document label generation system, according to one embodiment.

FIG. 2 illustrates a document label generation system, according to one embodiment. In the illustrated embodiment, the document label generation system 200 comprises a mapping algorithm 108 that includes a document label generator 202.

In one embodiment, the mapping algorithm 108 receives document 112, which describes a use of a segment of code in natural language. The mapping algorithm 108 can convert the natural language of the document 112 into vectors or word embeddings for machine learning processing. For example, the mapping algorithm 108 can implement bag of words techniques to generate fixed length vectors, or invoke vector conversion techniques to generate variable length vectors.

Bag of words techniques convert words of the document 112 into a vector of a preset length by allotting each unique word in the document 112 to an element of the vector. In one embodiment, each element of the vector is populated with a value that is initialized to 0. As the bag of words technique parses the document, each element of the vector is incremented at each occurrence of its corresponding unique word.

Vector conversion techniques convert words of the document 112 into a word embedding of a chosen length. Each unique word corresponds to one word embedding. In one embodiment, the word embeddings are populated via a machine learning training process, which positions the word embeddings in a multi-directional vector space such that words of similar context are clustered together. Therefore, the distance between words can be used to determine the context of the words.

As shown in FIG. 2, the mapping algorithm 108 includes a document label generator 202 that generates a first subset 210 of the first label set 114, and a second subset 212 of the first label set 114. The document label generator 202 can generate the first subset 210 from the document 112 via any combination of a keyword extraction process, a term frequency inverse document frequency (TF-IDF) process, part of speech tagging, or an attention mechanism determination process.

In one embodiment, the keyword extraction process comprises a function or a machine learning technique that identifies uncommon words in the document 112. For example, the description of the use of code can be stemmed to remove common words, conjunctions, and verbs. The remaining words may indicate important aspects of the code, and thus, can be used to populate the first subset 210 of the first label set 114. For example, the description of the document 112 ("After using ABC C++ version to extract text information, return the corresponding text") may be stemmed to "ABC, C++, Text," which may be used as labels in the first subset 210.

In one embodiment, the TF-IDF comprises a natural language processing technique that is used to find the relevancy of a term in a document 112. Term frequency (TF) measures how frequently the term occurs in the document 112. A first term of the document 112 can be more relevant than a second term of the document 112 if the first term occurs more frequently in the document 112 than does the second term. For example, the description of the document 112 ("After using ABC C++ version to extract text information, return the corresponding text") uses the term "text" more frequently than any other term in the description. Therefore, "Text" is likely to be relevant to the document, and may be used as a label in the first subset 210 of the first label set 114.

Inverse document frequency (IDF) can measure how frequently the term appears across multiple documents. The IDF can be used to scale the TF measurements in order to decrease the relevancy of terms that are used too frequently. For example, if multiple documents include the term "text," then the relevancy of the term may not be used as a label in the first subset 210 of the first label set 114.

In one embodiment, the part of speech tagging comprises a machine learning technique that classifies words of the document 112 based on the role the words play in the sentence. For example, each word in the document 112 can be tagged as a noun, pronoun, verb, adjective, or the like.

In one embodiment, the attention mechanism determination process comprises a deep learning technique that can determine the importance of each element of a vector to the vector as a whole. For instance, the vector input into the attention mechanism can be a sentence, and each element of the vector can be word. The attention mechanism determination process can generate multiple attention vectors, each of which focus on the importance of each element in the vector. The weighted average of the attention vectors can be used to determine the ultimate importance of the element to the vector. Therefore, words corresponding to elements that are deemed to be important in the document may be used as labels in the first subset 210 of the first label set 114.

In the illustrated embodiment, the mapping algorithm 108 generates the second subset 212 of the first label set 114 from the document 112 via a text convolutional neural network (CNN). The CNN can be trained using multiple documents and labels to establish predefined relationships between words of the documents and predefined labels. Therefore, the second subset 212 of the first label set 114 can include predefined labels based on the words of the document 112.

In one embodiment, the second subset 212 of the first label set 114 includes multi-label classifications for the document. For example, the CNN may determine that the document includes words (e.g., "ABC") typically associated with labels "Computing system vision, Image, OCR, and ABC4C++." Thus, these labels can be used to populate the second set 214 of the first label set 114.

Figure 3:
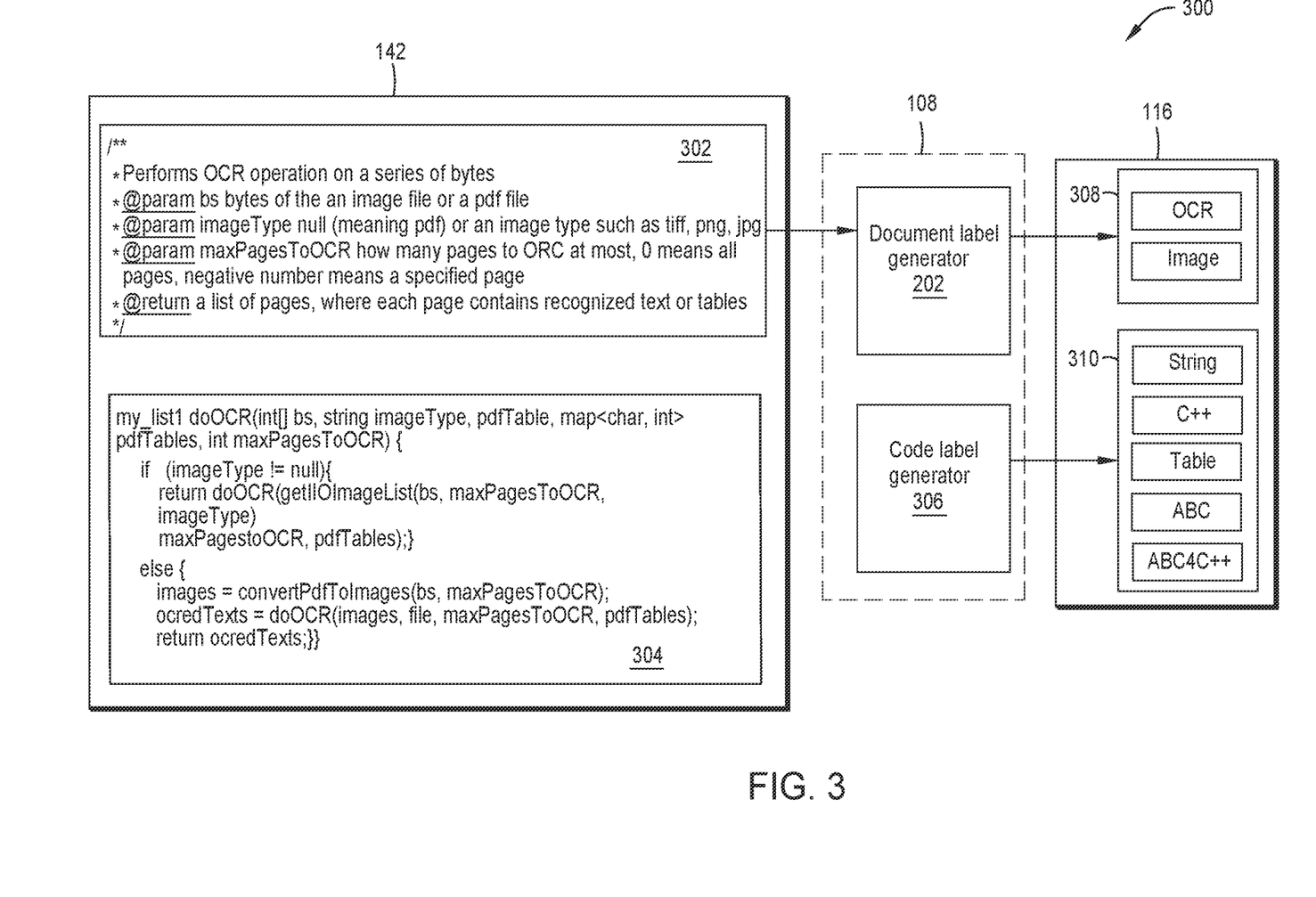
FIG. 3 illustrates a code label generation system, according to one embodiment.

FIG. 3 illustrates a code label generation system, according to one embodiment. In the illustrated embodiment, the code label generation system 300 comprises a mapping algorithm 108 that includes a code label generator 306.

In one embodiment, the mapping algorithm 108 receives code 142. The code 142 can include any number of code comments or code segments. In the illustrated embodiment, the code 142 includes a code segment 304 and code comments 302, which describe the use of the code segment 304.

As shown in FIG. 3, the mapping algorithm 108 includes a code label generator 306 that generates a first subset 308 of the second label set 116, and a second subset 310 of the second label set 116. The code label generator 306 can generate the first subset 308 of the second label set 116 from code comments 302 that accompany the code 142. In one embodiment, the mapping algorithm 108 generates the first subset 308 using the document label generator 202, as described in FIG. 2. For example, the document label generator 202 may process the code comments 302 to generate labels "OCR" and "Image" in the first subset 308.

The code label generator 306 can generate the second subset 310 of the second label set 116 from the code segment 304 via an analysis of any combination of a function name, a parameter or return type of a function or method, a programming language, or an external library use.

In one embodiment, the function name analysis comprises a machine learning part of speech analysis of the semantics of a function name of the code segment 304. For example, the function name "doOCR" may be stemmed to "OCR," and tagged as an acronym. In one embodiment, the mapping algorithm 108 can determine an acronym tag, or any other chosen part of speed tag, to be a label. Hence, "OCR" can be used to populate the second subset 310 of the second label set 116.

In one embodiment, the data type of a function parameter or return can be used as labels. For example, code segment 304 includes a function ("doOCR") that takes a string as an input parameter. Thus, "String (text)" can be used to populate the second subset 310 of the second label set 116.

In one embodiment, the programming language analysis comprises a machine learning determination of the keywords, semantics, or syntax of the code segment 304. For example, the mapping algorithm 108 can determine that the function of the code segment 304 follows a naming convention of a programming language, such as C, C++ or the like. Thus, "C++" can be used to populate the second subset 310 of the second label set 116.

In one embodiment, the external library use analysis comprises generating a label for each unique library that is imported, linked, called, or otherwise used in the code 142. For example, if the "doOCR" function of the code segment 304 is a call to a function of a library named "ABC4C++," then "ABC4C++" can be used to populate the second subset 310 of the second label set 116.

Figure 4:
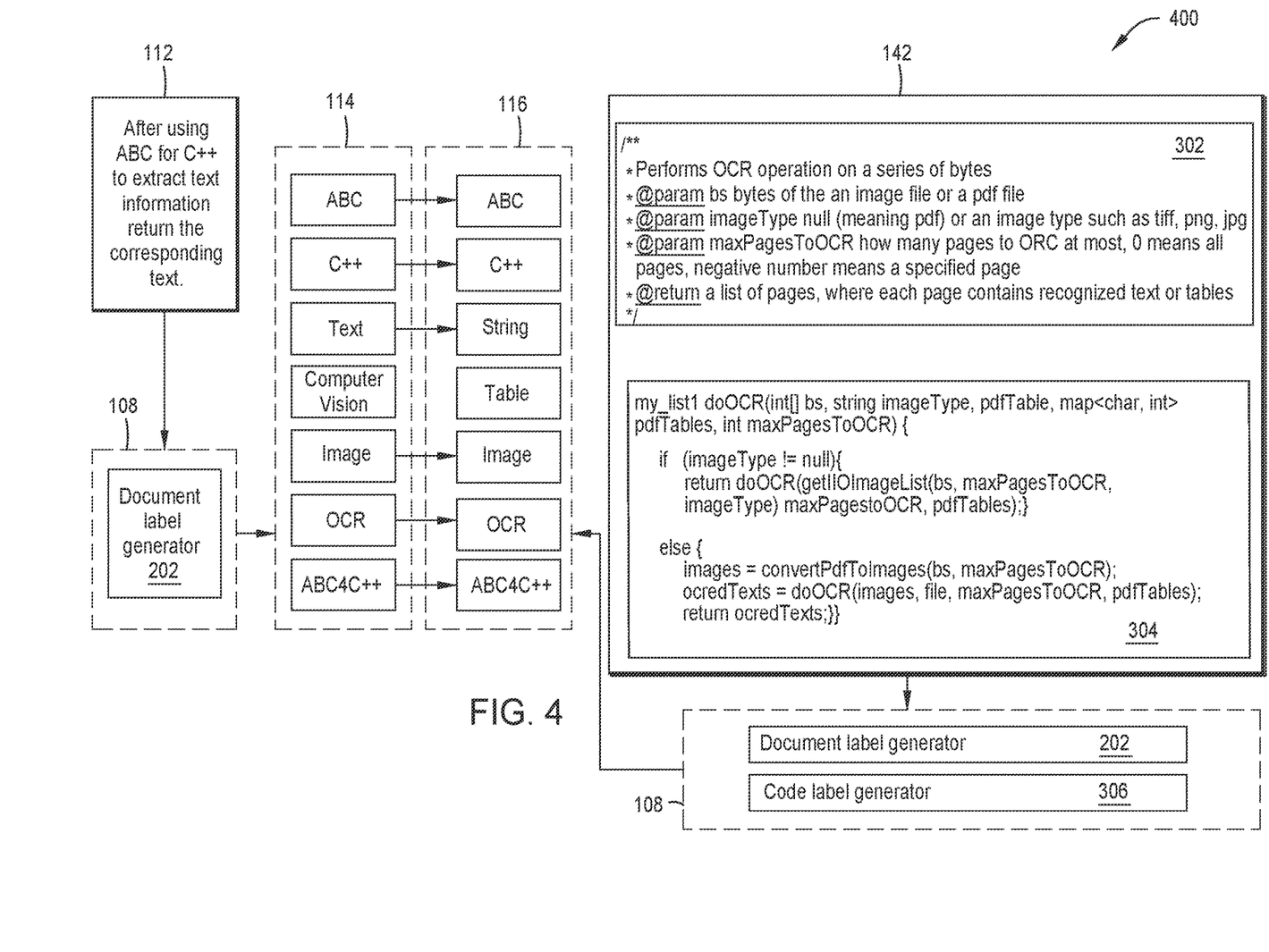
FIG. 4 illustrates a document and code mapping system, according to one embodiment.
Figure 5:
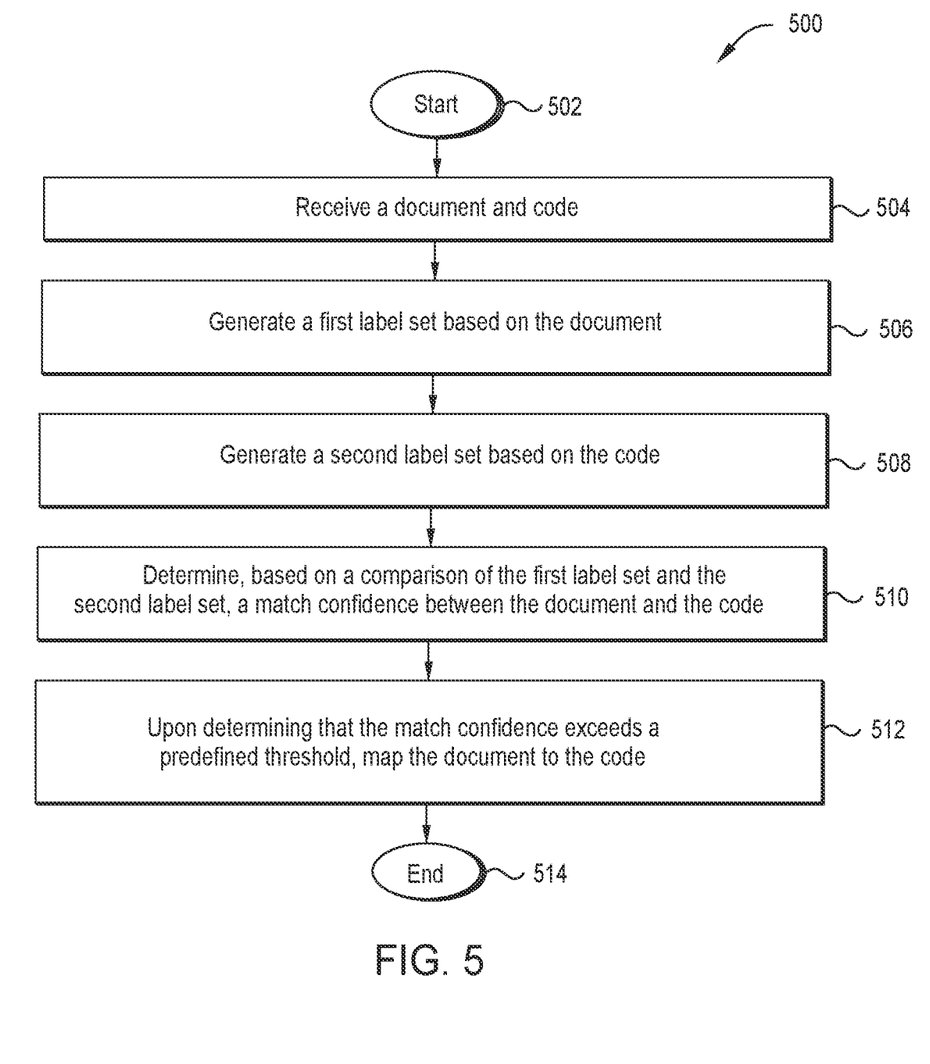
FIG. 5 depicts a flowchart of a method for implementing a document and code mapping system, according to one embodiment.

FIG. 4 illustrates a document and code mapping system, according to one embodiment. FIG. 5 depicts a flowchart of a method for implementing a natural language and code segment matching system, according to one embodiment. FIG. 4 is explained in conjunction with FIG. 5.

The method begins at block 502. At block 504, a mapping algorithm receives a document and code. In one embodiment, the document comprises a natural language description of a use of code. For instance, the document can be code comments, a code manual, a technical document, or a user story. In one embodiment, the code can include any number of code comments or code segments.

As shown in FIG. 4, code 142 comprises code comments 302 and code segment 304. In one embodiment, the mapping algorithm 108 comprises a document label generator 202 and a code label generator 306.

At block 506, the mapping algorithm generates a first label set based on the document. Returning to FIG. 4, the mapping algorithm 108 can implement the document label generator 202 to generate the first label set 114 from document 112. As previously discussed, in one embodiment, the document label generator 202 can generate the first label set 114 from the document 112 via any combination of a keyword extraction process, a term frequency inverse document frequency (TF-IDF) process, part of speech tagging, or an attention mechanism determination process.

At block 508, the mapping algorithm generates a second label set based on the code. As shown in FIG. 4, the mapping algorithm 108 can implement the document label generator 202 to generate labels for the second label set 116 from the code comments 302 using the aforementioned processes. Further, as previously discussed, the mapping algorithm 108 can implement the code label generator 306 to generate labels for the second label set 116 from the code segment 304 via an analysis of any combination of a function name, a parameter or return type of a function or method, a programming language, or an external library use.

At block 510, the mapping algorithm determines, based on a comparison of the first label set and the second label set, a match confidence between a segment of the document and a segment of the code. Returning to FIG. 4, in one embodiment, the mapping algorithm 108 determines the match confidence between the first label set 114 and the second label set 116 based on a comparison of matched labels to unmatched labels.

In one embodiment, the mapping algorithm 108 determines that labels of the first label set 114 and the second label set 116 match when the label texts are the same. In another embodiment, the mapping algorithm 108 determines that the labels match when the label texts include most of the same letters or spellings. In yet another embodiment, the mapping algorithm 108 determines that the labels match using a machine learning process that compares the similarity of concepts invoked by the labels. In the illustrated embodiment, each match between the label sets is unidirectional from the first label set 114 to the second label set 116. In another embodiment, each of the matches are bidirectional.

In one embodiment, the matching confidence is determined via a machine learning process based on predefined relationships between the labels of the first label set 114 and the second label set 116. In another embodiment, the matching confidence is determined as a number or percentage of the matched labels to unmatched labels between the first label set 114 and the second label set 116. For example, in the first label set 114 includes 6 labels that are matched to labels in the second label set 116, and 1 unmatched label ("Computing system vision"). The second label set 116 includes 6 labels matched to labels of the first label set 114, and 1 unmatched label ("table"). Therefore, 12/14 labels are matched, which is a matching confidence of 85.7% or 0.857.

At block 512, upon determining that the match confidence exceeds a predefined threshold, the mapping algorithm maps the segment of the document to the segment of code. Continuing the previous example, given a threshold of 0.8, the mapping algorithm 108 can determine that the matching confidence of 0.857 exceeds the threshold. Thus, the mapping algorithm 108 can map the segment of the document 112 to the code segment 304, and make the mapping available to any user of the document 112 or code 142. The method ends at block 514.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-readable storage medium including computer program code that, when executed on one or more computer processors, performs an operation comprising:
receiving a document and software code, wherein the document comprises a natural language description of a use of the code;
generating, via a vectorization process performed on the document, at least one vector or word embedding;
generating, via a natural language processing technique performed on the at least one vector or word embedding, a first label set;
generating, via a machine learning analysis of the software code, a second label set;
determining, based on a comparison of the first label set and the second label set, a match confidence between the document and the software code, wherein the match confidence indicates a measure of similarity between the first label set and the second label set; and
upon determining that the match confidence exceeds a predefined threshold, mapping the document to the software code.

2. The computer-readable storage medium of claim 1, wherein the document comprises code comments, a code manual, a technical document, or a user story, wherein labels of the first label set include words or phrases used to identify content of the document, and wherein labels of the second label set include words or phrases used to identify content of the software code.

3. The computer-readable storage medium of claim 1, wherein a first subset of the first label set is generated via at least one of: a keyword extraction process, a term frequency inverse document frequency (TF-IDF) process, part of speech tagging, or an attention mechanism determination process.

4. The computer-readable storage medium of claim 3, wherein a second subset of the first label set comprises a multi-label classification generated via a text convolutional neural network.

5. The computer-readable storage medium of claim 1, wherein a first subset of the second label is generated via at least one of: a keyword extraction process, a term frequency inverse document frequency (TF-IDF) process, part of speech tagging, an attention mechanism determination process, or via a text convolutional neural network.

6. The computer-readable storage medium of claim 5, wherein a second subset of the second label set is generated via at least one of: an analysis of any combination of a function name, a parameter or return type of a function or method, a programming language, or an external library use.

7. The computer-readable storage medium of claim 1, wherein the matching confidence is determined via a machine learning process based on predefined relationships between labels of the first label set and the second label set.

8. The computer-readable storage medium of claim 1, wherein the matching confidence is determined as a number or percentage of matched labels to unmatched labels between the first label set and the second label set.

9. A method comprising:
receiving a document and software code, wherein the document comprises a natural language description of a use of the code;
generating, via a vectorization process performed on the document, at least one vector or word embedding;
generating, via a natural language processing technique performed on the at least one vector or word embedding, a first label set;
generating, via a machine learning analysis of the software code, a second label set;
determining, based on a comparison of the first label set and the second label set, a match confidence between the document and the software code, wherein the match confidence indicates a measure of similarity between the first label set and the second label set; and upon determining that the match confidence exceeds a predefined threshold, mapping the document to the software code.

10. The method of claim 9, wherein the document comprises code comments, a code manual, a technical document, or a user story, wherein labels of the first label set include words or phrases used to identify content of the document, and wherein labels of the second label set include words or phrases used to identify content of the software code.

11. The method of claim 9, wherein a first subset of the first label set is generated via at least one of: a keyword extraction process, a term frequency inverse document frequency (TF-IDF) process, part of speech tagging, or an attention mechanism determination process.

12. The method of claim 11, wherein a second subset of the first label set comprises a multi-label classification generated via a text convolutional neural network.

13. The method of claim 9, wherein a first subset of the second label is generated via at least one of: a keyword extraction process, a term frequency inverse document frequency (TF-IDF) process, part of speech tagging, an attention mechanism determination process, or via a text convolutional neural network.

14. The method of claim 13, wherein a second subset of the second label set is generated via at least one of: an analysis of any combination of a function name, a parameter or return type of a function or method, a programming language, or an external library use.

15. The method of claim 9, wherein the matching confidence is determined via a machine learning process based on predefined relationships between labels of the first label set and the second label set.

16. A system, comprising:

a processor; and a memory storing an application which, when executed by the processor, performs an operation comprising:

receiving a document and software code, wherein the document comprises a natural language description of a use of the code;

generating, via a vectorization process performed on the document, at least one vector or word embedding;

generating, via a natural language processing technique performed on the at least one vector or word embedding, a first label set;

generating, via a machine learning analysis of the software code, a second label set;

determining, based on a comparison of the first label set and the second label set, a match confidence between the document and the software code, wherein the match confidence indicates a similarity between the first label set and the second label set; and upon determining that the match confidence exceeds a predefined threshold, mapping the document to the software code.

17. The system of claim 16, wherein a first subset of the first label set is generated via at least one of: a keyword extraction process, a term frequency inverse document frequency (TF-IDF) process, part of speech tagging, or an attention mechanism determination process, and wherein labels of the first label set include words or phrases used to identify content of the document.

18. The system of claim 17, wherein a second subset of the first label set comprises a multi-label classification generated via a text convolutional neural network.

19. The system of claim 16, wherein a first subset of the second label is generated via at least one of: a keyword extraction process, a term frequency inverse document frequency (TF-IDF) process, part of speech tagging, an attention mechanism determination process, or via a text convolutional neural network and wherein labels of the second label set include words or phrases used to identify content of the software code.

20. The system of claim 19, wherein a second subset of the second label set is generated via at least one of: an analysis of any combination of a function name, a parameter or return type of a function or method, a programming language, or an external library use.

* * * * *